United States Patent [19]

Engel

[11] 4,141,216
[45] Feb. 27, 1979

[54] COMBINATION SHUTTLE AND HIGH-PRESSURE RELIEF VALVE

[75] Inventor: William K. Engel, Peoria, Ill.

[73] Assignee: Caterpillar Tractor Co., Peoria, Ill.

[21] Appl. No.: 798,952

[22] Filed: May 20, 1977

[51] Int. Cl.$^2$ ............................................. F15B 21/04
[52] U.S. Cl. ........................................ 60/454; 60/461;
   60/464; 60/476; 417/304
[58] Field of Search ................. 60/453, 454, 459, 461,
   60/464, 473, 475, 476, 494; 137/116; 417/304

[56] References Cited

U.S. PATENT DOCUMENTS

| | | | |
|---|---|---|---|
| 2,601,967 | 7/1952 | Larsen | 251/118 |
| 2,811,979 | 11/1957 | Presnell | 137/112 |
| 2,961,829 | 11/1960 | Weisenbach | 60/464 |
| 3,094,937 | 6/1963 | McAfee | 137/116 X |
| 3,507,298 | 4/1970 | Ratliff | 137/106 |
| 3,512,360 | 5/1970 | Bopp et al. | 60/461 |
| 3,591,965 | 7/1971 | Bobst et al. | 60/464 |

*Primary Examiner*—Edgar W. Geoghegan
*Attorney, Agent, or Firm*—Phillips, Moore, Weissenberger, Lempio & Majestic

[57] ABSTRACT

A combination shuttle and high pressure relief valve is provided within a hydrostatic drive or transmission system. The valve is constructed with a spool member in two sections. The sections include hooks that interact with one another to lock the spool sections together in one mode of operation, yet permitting the spool sections to act independently in another mode of operation. Complete fluid charging of the fluid system is ensured by dual flow circuitry between the system pump and motor, while a restrictor valve means is connected to the shuttle and pressure relief valve to provide continuous flow of fluid through a system filter.

10 Claims, 1 Drawing Figure

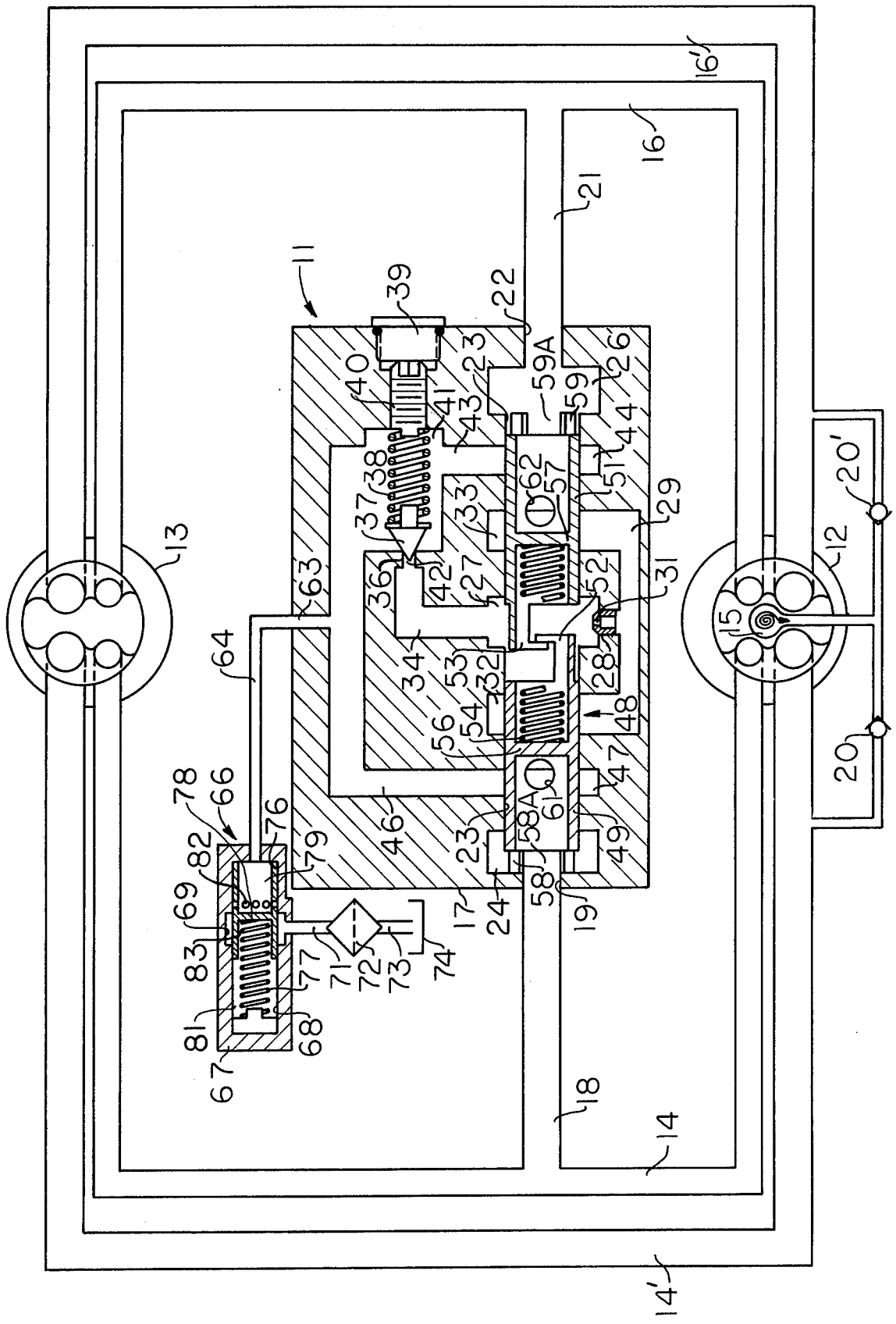

COMBINATION SHUTTLE AND HIGH-PRESSURE RELIEF VALVE

BACKGROUND OF THE INVENTION

Hydrostatic drive or transmission systems require careful control of system hydraulic pressures and provisions for changing direction of hydraulic fluid flow when the driven is shifted from forward to reverse drive and vice-versa. Overpressures in the system must be carefully controlled and high or excessive pressures must be rapidly reduced to prevent damage to the component parts. In order to provide for overpressure protection, high pressure relief valves are generally provided for in such systems. Shuttle valves are also provided to enable communication of hydraulic fluid from either side of the hydraulic circuits upon a reverse in hydraulic fluid pressurization.

SUMMARY OF THE INVENTION

The present invention is directed to overcoming one or more of the problems set forth above.

Accordingly, the present invention is a simplified combination high pressure relief and shuttle valve that serves to communicate hydraulic fluid from either side of an hydraulic circuit to a filter and tank, while at the same time, serves to dump excessive high pressures from either side of the hydraulic circuit. Essentially, the valve includes a two part valve spool wherein the separate spools sections are moveably interconnected by intermeshing hooks. The separate spool sections are normally maintained in spaced-apart relationship by a spring member. Under certain conditions, however, as hereinafter explained, the spring member may be collapsed to permit one spool section to bear up against the other section to effectively shorten the valve spool and open previously unexposed ports to hydraulic fluid.

BRIEF DESCRIPTION OF THE DRAWING

The single FIGURE of the drawing illustrates in schematic format the combination valve of the invention in a hydrostatic system.

DETAILED DESCRIPTION OF THE INVENTION

With reference to the single FIGURE of the drawing there is illustrated the combination valve 11 in a hydrostatic hydraulic system wherein a pump 12 drives a motor 13 through conduits 14 and 16. Dual flow conduits 14' and 16' are also provided for operation of the system. These conduits are also in direct communication between pump 12 and motor 13. Their function will be explained hereinafter.

Depending upon the direction of operation of motor 13, conduits 14 and 16 may conduct either high pressure fluid from the pump to the motor; or conversely, low pressure fluid from the motor to the pump. It will be understood that when conduit 14 is conducting high pressure fluid, conduit 16 will be conducting low pressure fluid, and vice-versa.

A subsidiary charge pump 15 is associated with pump 12. Subsidiary charge pump 15 has a fluid inlet communicating with system tank 74 and an outlet that is branched to communicate with check valves 20,20' which, in turn, communicate with duel flow conduits 14' and 16'.

Conduit 14 is connected to the combination valve housing 17 by a conduit 18 in communication with an inlet-outlet port 19. Similarly, conduit 16 is connected to the combination valve housing 17 by a conduit 21 in communication with an inlet-outlet port 22. Both ports 19 and 22 open into a central valve bore 23.

An annulus 24 enlarges bore 23 immediately inward from port 19; while a similar annulus 26 enlarges bore 23 immediately inward of port 22. A central annulus 27 communicates with bore 23 midway between the left and right hand ends of valve housing 17. A short passage 28 communicates with central annulus 27, and, in turn, opens into a passageway 29.

A small orifice 31 is fixed in passageway 28 whereby fluid flow between passageway 29 and annulus 27 is restricted.

Passageway 29, at either end thereof, opens into annuli 32 and 33, respectively. Annulus 32 opens into bore 23 approximately one third the distance from central annulus 27 to annulus 24; while annulus 33 opens into bore 23 approximately one third the distance from central annulus 27 to annulus 26.

Opposite passageway 28 and orifice 31, annulus 27 communicates with passageway 34, whose remote end terminates in a poppet valve seat 36. Valve seat 36 receives poppet valve 27 therein to normally block the end of passageway 34. Valve 37 is urged into sealing relationship with the end of passageway 34 by a spring 38, whose force is adjustable, e.g., by a threaded plug 39, or screw 40.

Spring 38 and poppet valve 37 extend through a chamber 41 having three openings therein. A first opening 42 passes through valve seat 36 to place passageway 34 into communication with chamber 41. A passageway 43 provides a second opening to chamber 41. Passageway 43 terminates in an annulus 44 opening into and surrounding bore 23. Annulus 44 is approximately two thirds the distance from central annulus 27 to annulus 26. Another passageway 46 provides a third opening to chamber 41. Passageway 46, in turn, extends to bore 23 to terminate in annulus 47, which is approximately two thirds the distance from central annulus 27 to annulus 24.

A valve spool structure 48 is enclosed within bore 23. Spool structure 48 comprises a first spool portion 49 and a second spool portion 51. Although each portion is physically independent of the other, both portions have centrally extending lips 52,53 respectively, integral therewith. The lips 52,53 are so dimensioned as to extend over one another to effectively lock each portion to the other, when said portions are urged apart by a centrally mounted spring 54. Spring 54 bears up against transversely disposed walls 56,57 respectively, that close off and bisect hollow interior portions of both spool portions.

It will be noted, however, that under certain circumstances to be described hereinafter, spring 54 may be collapsed to permit compression of at least one of the spool portions towards the other spool portion to effectively shorten the operating length of spool structure 48.

Both spool portions further include legs 58,59 respectively, that extend axially towards the respective inlets/outlets 19 and 22 and define notches 58A,59A therebetween. The legs are dimensioned so as to bear against the outward wall of annuli 24,26 respectively, should either spool portion be moved to the extreme ends of bore 23.

Both spool portions 49,51 further include ports 61,62 positioned a short distance outwardly of walls 56,57 respectively. Said ports communicate the hollow interiors of the spool portions to the exterior thereof.

An outlet 63 communicates passageway 46 to a conduit 64, which, in turn, communicates with a tank restrictor valve 66. Valve 66 includes a housing 67 which defines a bore 68 therein. Bore 68 is in communication with conduit 64, and also with an annulus 69. Annulus 69, in turn, communicates with an exit conduit 71 that leads to an hydraulic fluid filter 72. A conduit 73 leads from filter 72 to the system tank 74.

A valve spool 76 is slideably fitted within bore 68 and is urged to seal off annulus 69 by spring means 77. One end of said spring bears against a wall 78 that divides spool 76 into an upstream chamber 79 and a spring chamber 83. A series of small ports 82, placed close to wall 78, and circumferentially around spool 76, communicates chamber 79 to the exterior of spool 76.

OPERATION OF THE INVENTION

The valve 11 operates both as a shuttle valve and as a high pressure relief valve as follows:

In the shuttle mode, when high pressure fluid appears in conduit 21, pressure against wall 57 forces spool portion 51 to the left. This leftward motion is also imparted to spool portion 49 through spring 54. Both spool portions thereupon move leftwardly until legs 58 bear against the outward wall of annulus 24. Thus the valve 11 is positioned as shown in the drawing.

As the spools move leftwardly, port 62 opens into annulus 33 and passageway 29. High pressure fluid is thus communicated through orifice 31 and from thence into annulus 27 and the chamber between the two spool portions. The fluid pressure in the chamber, combined with the pressure of spring means 54, is thus greater than the fluid pressure alone on the upstream side of wall 57, whereby the spool portions remain in the positions illustrated in the drawing.

At the same time as high pressure fluid is present in conduit 21 low pressure fluid is present in conduit 18. When the spools are positioned as shown, this low pressure fluid is communicated into passageway 46 through port 61. This pressure is also communicated to restrictor valve 66 through passageway 63 and conduit 64.

It will also be noted that subsidiary charge pump 15 continuously supplies fluid to the low pressure side of dual flow conduits 14' or 16' through either check valve 20 or 20', as the case may be. The volume of low-pressure fluid is thereby maintained in the fully charged condition. Thus, charge pump 15, at all times, ensures an adequate supply of "make-up" fluid to the low-pressure dual flow conduit between the pump and motor. It will be also noted that the fluid supplied by subsidiary charge pump 15 is drawn from tank 74, which fluid has been previously filtered by passing through filter 72. Since conduits 14' and 16' are directly connected to pump 12 and motor 13, it will be apparent that the filtered fluid is forced to pass through the pump-motor circuit at least once before it can enter conduits 14 and 16, wherein it may be circuited through combination valve 11. Thus the dual circuit ensures that fresh filtered hydraulic fluid cannot be short-circuited back to the tank.

The spring constant of spring means 77 is selected such that spool 76 is moved, under system low pressure, sufficiently to expose ports 82 to annulus 69. Thus, low pressure fluid from the system is communicated with, and through, filter 72, to tank 74 on a continuous basis so long as the hydrostatic system is operating in a normal, steady-state condition. This constant flow of low pressure fluid is desirable in order to ensure continual filtration of at least a portion of the hydraulic fluid during normal operations.

It will be apparent that, upon reversal of the hydrostatic pump, the high-pressure and low-pressure in conduits 14 and 16, also reverse, i.e., high pressure fluid appears in conduits 14 and 18 while low pressure fluid appears in conduits 16 and 21. In such circumstances, spool portions 49 and 51 are shifted rightwardly in bore 23 until legs 59 bear up against the outside wall of annulus 26. High pressure fluid communicates to the spring chamber between the two spool portions through port 61, annulus 32, passageway 29 and orifice 31, whereby the combined pressures of the fluid and spring means 54 is sufficient to maintain the two spool portions as far apart as permitted by lips 52,53.

At the same time, port 61 is closed off from annulus 47 and passageway 46; while port 62 is closed off from annulus 33 and passageway 29, but, in turn, is opened into annulus 44 and passageway 43. Thus, low pressure fluid from conduit 21 is communicated to restrictor valve 66 through chamber 41, passageway 63 and conduit 64.

As noted before, this steady-state low pressure is just sufficient to open ports 82 to annulus 69, wherefore low pressure fluid from conduits 21 is now shunted through filter 72 to tank 74, and continual filtration takes place.

Thus, it will be apparent that low-pressure fluid is continually shuttled through filter 72 by valve 11 during operation of the hydrostatic system in either the forward or reverse positions.

As a high pressure relief valve, the invention operates as follows:

Assuming that the system is operating with high pressure in conduit 21, the spools 49,51 will be positioned as shown in the drawing. In the event a surge of high pressure fluid occurs in the system, the pressure will increase in annulus 27 as the increased pressure is transmitted through port 62, passageway 29 and orifice 31. The increased pressure is communicated through passageway 34 to the face of the poppet valve 37. If the pressure surge is sufficiently high to overcome the force of poppet spring means 38, the valve will be forced away from seat 36, permitting high pressure fluid to escape into chamber 41. Due to the restriction of orifice 31, the total pressure in the chamber between spool portions 49,51 will immediately drop. Since the high pressure is still being applied to spool wall 57, spring means 54 will collapse and permit spool portion 51 to move to the left and thereby open notches 59A to annulus 44. Thus, high pressure fluid can pass directly from conduit 21 into passageway 43 and chamber 41. In such event, high pressure fluid will be dumped via 46,47,61,18 into the low pressure side of the system and the pump and motor will be protected from over-pressures.

It should also be noted that the high pressure appearing in chamber 41 and passageway 46 will be communicated to restriction valve 66. However, as soon as high pressures are experienced, spring means 77 will further collapse to permit spool 76 to move all the way to the left, whereby ports 82 will be cut off from annulus 69. Thus, the high pressure fluid surge is cut off from filter 72, and any possible damage thereto is averted, and transmission loop starvation is averted.

The valve 11 operates as a relief valve in similar fashion when the pressures in conduits 14 and 16 are reversed.

The embodiments of the invention in which an exclusive property or privilege is claimed are defined as follows:

1. In a combination shuttle and high pressure relief valve, wherein said valve is communicated to a hydraulically actuated pump-motor system on both a high pressure side and a low pressure side thereof, and wherein said high and low pressure sides interchange upon forward and reverse operation of said system; valve spool means in said valve comprising first and second spool portions, slideable within a valve bore, with said high and low pressure side means interconnecting said spool portions to move both said spool portions to that portion of said bore next adjacent the low pressure side of said system, collapsible means between said two spool portions to hold said spool portions apart under normal pressure conditions in said system means responsive to excess pressure in said system, operative to cause collapse of said collapsible means and permit said two spool portions to shorten their collective effective lengths, and means in said spool and said valve to communicate excessively high pressure fluid from the high pressure side of said system into the low pressure side of said system upon the shortening of the effective collective lengths of said spool portions.

2. The valve of claim 1, wherein said first and second spool portions are interlocked by means of hooked portions attached to each spool portion with said hooks overlapping to lock said spool portions together in an extended apart position and to permit movement of said spool portions towards one another.

3. The valve of claim 2, wherein the collapsible means is a spring interposed between said spool portions to hold said spool portions apart under normal pressure conditions in said system, said spring being collapsible under excess pressure conditions to permit either one of the said spool portions to move towards the other spool portion to thereby effectively decrease the overall length of said spool.

4. The valve of claim 1, wherein the excess pressure responsive means comprises a poppet valve in communication on its upstream side with the valve bore between said spool portions, and on its downstream side with the low pressure side of said system.

5. The valve of claim 4, wherein said excess pressure responsive means further includes a passageway in communication with the valve bore between said spool portions at a first end thereof, and in communication with the high pressure side of said system at the other of its ends, and fluid flow restrictor means in said passageway.

6. The valve of claim 1, wherein said means in said spool and said valve to communicate high pressure fluid to the low pressure side of said system upon the shortening of the effective collective lengths of said spool portions comprises a passageway in said valve communicating at one end to a first end of said bore and with a first port extending through the first spool portion in communication with one side of said system, said passageway communicating at its other end to the second end of said bore and with a second port extending through the second spool portion in communication with the other side of said system.

7. The valve of claim 1, further including a restrictor valve associated with said valve, and means in said valve for communicating low pressure fluid to said restrictor valve.

8. The valve structures of claim 7, wherein said restrictor valve communicates with a tank for said system.

9. The structure of claim 8, wherein a system fluid filter is in fluid communication between said restrictor valve and said tank.

10. The restrictor valve of claim 8 wherein said valve includes means for passing low pressure fluid therethrough to said filter, means for shutting said valve upon application of high pressure fluid thereto, and means for shutting said valve should fluid pressure fall below a predetermined level.

* * * * *